United States Patent Office 3,334,045
Patented Aug. 1, 1967

3,334,045
FIRE RETARDANT COMPOSITION AND METHOD
Kenneth E. Nelson, Phoenix, Ariz., assignor to Arizona Agrochemical Corporation, a corporation of Arizona
No Drawing. Filed Nov. 27, 1964, Ser. No. 414,436
4 Claims. (Cl. 252—2)

ABSTRACT OF THE DISCLOSURE

Fire retardant compositions are prepared by first hydrating a swelling bentonite clay and thereafter introducing electrolytic, fire retardant salts into the composition. This results in stable aqueous suspension which is especially adapted for aerial application in combating forest and brush fires.

---

This invention relates to a novel fire retarding composition and method, and particularly to a composition and method employing compatible mixtures of bentonite clay and a fire retardant salt.

Forest fires annually cause the loss of millions of dollars worth of timber and other property. Not only is the direct property loss due to forest fires catastrophic, but concomitant soil sterilization and water shed problems are also grave. It is desirable, therefore, to minimize and control the spread of forest fires wherever possible.

One of the simplest and best known of fire fighting techniques is to distribute water containing a fire retardant salt over timber and other flora in the path of a forest fire to thus render the timber and other flora non-combustible. Various methods of distributing the water, including direct spraying and aerial dropping, have been employed. Aerial dropping is advantageous since areas which are not easily accessible may be treated.

In aerial dropping fire fighting techniques, an airplane or a plurality of airplanes is employed to drop fire retardant material such as water containing a fire retardant salt in a specified pre-selected target area, thereby to coat the flora with the wet fire retardant. The plane or planes employed usually drop along a line which has been established as a fire break.

Planes employed in fire fighting generally have a tank or tanks built into them, said tanks having a trap door-like emptying means. In this manner, the liquid fire retardant is discharged from the tank in a substantially coherent mass.

It is desirable that the fire retardant material be discharged from the airplane in a coherent mass in order to provide adequate concentration of the fire retardant material on the exposed surfaces of the flora below.

Water containing a fire retardant salt has a tendency to atomize into small droplets and disperse over a wide area when dropped from significant altitudes. For this reason, airplanes used in fire fighting must drop their loads at dangerously low altitudes.

It has been proposed to increase the viscosity of water by adding a thickening agent so that aerial dropping may be carried out at substantially higher altitudes without undesirable atomization.

Thickening agent-water mixtures have been tested for use as fire fighting materials. These materials suffer from several disadvantages, notably the lack of fire retardant life. Ordinarily, the maximum fire retardancy period under usual summer conditions is from about two to about three hours. Thus, it would not be feasible to prepare a fire break by aerial means much in advance of a forest fire.

I have discovered a flame retardant composition which has excellent cohesion for aerial drop application and has extended periods of fire retardation effectiveness.

In accordance with my invention, I first hydrate sodium bentonite clay and then add a fire retardant salt or mixture of salts. The salt may be added in the dry state but is preferably in the form of an aqueous solution or slurry. Deviation from this procedure results in a mixture which is of substantially lessened value both for aerial drop application and as a fire retardant generally.

Ordinarily, about 11 pounds of water will hydrate 1 pound of clay. If desired, more water may be added to bring the relative proportions of water and clay to the desired level. Depending on the desired viscosity of the composition, from about 1 to about 9 percent sodium bentonite clay by weight of water is usually present.

Fire retardant salt may be present in the composition in amounts of from about 1 percent based on the water content to its saturation limit in water, but ordinarily will be present in amounts of from about 10 to about 25 percent based on the weight of water in the composition. Usually, however, I prefer concentration of fire retardant salt of from about 14 to about 20 percent based on the weight of water in the composition.

It is preferred that the fire retardant composition of my invention be as viscous as permissible when considering pumping and other handling limitations. Usually, a viscosity of from about 1,000 to about 3,000 centipoise when measured on a Brookfield viscometer having a spindle speed of 60 revolutions per minute is appropriate. Because of these viscosity limitations, I generally prefer a clay content of from about 2 to about 6 percent by weight of water in my composition.

Another factor which strongly effects viscosity is pH. As pH increases above about 10, or decreases below about 6, marked increases in viscosity of the composition take place. For this reason, I generally prefer to keep the pH of my compositions controlled to a range of from about 6 to about 10.

Any of the fire retardant salts generally known to those skilled in the art such as, for example, those listed in "The Use of Chemicals in Forest Fire Control," U.S.D.A. Forest Products Lab, Madison, Wis., No. 1199, March 1956, are appropriate for use in accordance with my invention. I generally prefer those fire retardant salts which are low in mammalian and floral toxicity. Typical of my preferred fire retardant salts are diammonium phosphate, monoammonium phosphate and ammonium sulphate.

My fire retardant compositions and method of preparing them are particularly unexpected in view of the writings of technicians and scientists skilled in the chemical fire fighting art. A recent publication of the National Fire Protection Association Forest Committee entitled "Chemicals for Forest Fire Fighting," published in 1963, states that sodium bentonite clay is classed as a short term fire retardant and has the undesirable characteristics of being effective for only one or two hours under summer conditions and that it is not compatible with fire retardant salts. Specifically mentioned as one of the fire retardant salts with which sodium bentonite clay is not compatible for use as a fire retardant is diammonium phosphate.

My fire retardant compositions may be prepared and shipped in a liquid slurry state, but are preferably prepared in the field. I usually provide two mixing tanks with agitators. I dump a pre-determined amount of sodium bentonite clay and water into the first tank and mix to hydrate the clay. I then transfer the clay-water mixture into a second tank and add an aqueous solution of fire retardant salt and water. Agitation is carried out until the mixture has a substantially uniform composition. The reason for transferring the bentonite-water mixture into the second mixing tank before adding the salt is that any residual salt in a tank will inhibit or prevent the hydration of the clay unless the tank is rinsed. By providing two tanks, I can prepare successive batches of fire retardant composition without special rinsing of the equipment. The fire retardant composition is then transferred either by direct pumping, or by other means, to an aircraft which has been adapted for aerial drop forest fire fighting.

The airplane then flies to the target area and drops its load of fire retardant composition thereon. Because of the high viscosity of my composition, the drop may be carried out at safer altitude and still maintain the requisite coverage of flora in the drop zone. Fire retardant life of my composition under ordinary summer conditions may be as high as several weeks.

Another advantage of my composition is that it is thixotropic. By thixotropy is meant the property of a composition which on standing appears as a sort of gel but which, when a shear force is applied thereto, liquefies and may be pumped. In general, then, thixotropy may be described as the characteristic of being a liquifiable gel. Because of this thixotropy, my compositions may readily be transferred from the preparation tanks into the aircraft and easily discharged from the aircraft. Upon striking and coating flora in the drop zone, my composition returns to the gel state thereby improving its adhesion characteristics. The good adhesion is instrumental in both providing the uniform coating of the flora with my composition and prolonging the fire retardance thereof.

For ease in identification of areas previously treated, I usually provide a dye in my fire retardant composition. This is particularly helpful when a series of drops must be made by one plane or when several planes are being employed to treat a specified area. The dye substantially prevents duplication of treatment of one area with consequent omission of treatment of another area.

After a target zone has been treated with my fire retardant composition, the fire retardant composition eventually dries leaving a mixture of fire retardant salt and sodium bentonite clay coating the floor. This coating of sodium bentonite clay intimately admixed with fire retardant salt has been unobtainable heretofore. Previously employed mixing techniques were inappropriate, since the bentonite clay does not hydrate in the presence of salts, but, as I have discovered, will uniformly mix with the salts after having been previously hydrated.

*Example*

Sodium bentonite clay is mixed with water to provide a composition containing about 9 percent by weight clay. An aqueous solution of diammonium phosphate is mixed with the clay containing water mixture. The mixture thus produced contains 5 percent sodium bentonite clay based on the water content and 16 percent diammonium phosphate based on the water content. The water-clay-salt mixture is tested in a Brookfield viscometer having a speed of 60 revolutions per minute. The viscosity of the mixture is about 3,000 centipoise.

The mixture shows excellent adhesion to test wood sticks and shows excellent fire retardant properties. Even after a considerable period of time and dry-out of the composition, the fire retardant properties are substantially maintained.

Employing substantially the same techniques, monoammonium phosphate or ammonium sulphate may be substituted for the diammonium phosphate employed above with substantially the same excellent results.

As will be appreciated by those skilled in the art, the compositions herein described can be further modified by the inclusion of special purpose ingredients such as corrosion inhibitors and the like.

Various modifications may be made in my invention without departing from the spirit or scope thereof, and it is to be understood that I limit myself only as defined in the appended claims.

I claim:
1. A fire retardant composition consisting essentially of
   (a) a fire suppressing salt having low mammalian and plant toxicity selected from the class consisting of monoammonium phosphate, diammonium phosphate and ammonium sulfate, said fire suppressing salt being present in said composition in an amount sufficient to provide substantial fire retardant action when said composition is applied to flora;
   (b) hydrated sodium bentonite clay in an amount sufficient to form with the other elements of said composition a highly viscous mass suitable for aerial application; and
   (c) water in an amount sufficient to dissolve said salt and form a viscous mass with said hydrated bentonite clay.
2. Composition of claim 1 in which said clay is present in an amount of from 1–9 percent and said salt is present in an amount of from 10–25 percent, said percentages being by weight of the water present in the composition.
3. The method of fighting and suppressing forest and brush fires comprising coating flora therein with a composition consisting essentially of
   (a) a fire suppressing salt having low mammalian and plant toxicity selected from the class consisting of monoammonium phosphate, diammonium phosphate, and ammonium sulfate, said fire suppressing salt being present in said composition in an amount sufficient to provide substantial fire retardant action when said composition is applied to flora;
   (b) hydrated sodium bentonite clay in an amount sufficient to form with the other elements of said composition a highly viscous mass suitable for aerial application; and
   (c) water in an amount sufficient to dissolve said salt and form a viscous mass with said hydrated bentonite clay.
4. The process of preparing a fire retardant composition adapted to aerial application comprising in order the steps of
   (a) hydrating sodium bentonite clay by mixing said clay with sufficient water to hydrate said clay and produce a viscous aqueous dispersion thereof;
   (b) introducing into said dispersion a fire suppressing salt having low mammalian and plant toxicity selected from the class consisting of monoammonium phosphate, diammonium phosphate, and ammonium sulfate; and
   (c) agitating the hydrated clay-water-salt composition until a substantially uniform composition is obtained.

References Cited

UNITED STATES PATENTS

| | | | |
|---|---|---|---|
| 2,969,116 | 1/1961 | Guise | 252—2 X |
| 3,196,108 | 7/1965 | Nelson | 252—2 |
| 3,245,904 | 4/1966 | Young | 252—7 |
| 3,247,107 | 4/1966 | Gilchrist | 252—2 |

OTHER REFERENCES

Chemical Week, Oct. 7, 1961, vol. 89, No. 14, pp. 39–40.

U.S. Dept. of Agriculture—Forest Service, March 1956, No. 1199, page 12, Table I.

LEON D. ROSDOL, *Primary Examiner.*

M. WEINBLATT, *Examiner.*